United States Patent [19]

Cotty

[11] Patent Number: 5,097,503
[45] Date of Patent: Mar. 17, 1992

[54] ELECTRONIC SUBSCRIBER LINE CONNECTION CIRCUIT

[75] Inventor: Joël Cotty, Perros Guirec, France

[73] Assignee: Alcatel Cit, Paris, France

[21] Appl. No.: 471,350

[22] Filed: Jan. 29, 1990

[30] Foreign Application Priority Data

Jan. 31, 1989 [FR] France .............. 89 01173

[51] Int. Cl.⁵ .............................................. H04M 1/00
[52] U.S. Cl. .................... 379/399; 379/398; 379/387
[58] Field of Search ............. 379/399, 398, 400, 401, 379/402, 403, 404, 405, 387

[56] References Cited

U.S. PATENT DOCUMENTS

| | | | |
|---|---|---|---|
| 4,484,032 | 11/1984 | Rosenbaum | 379/405 |
| 4,540,852 | 9/1985 | Albouy et al. | |
| 4,567,331 | 1/1986 | Martin | |
| 4,677,669 | 6/1987 | Kawami et al. | 379/399 |
| 4,829,567 | 5/1989 | Moisin | 379/405 |
| 4,837,818 | 6/1989 | Pieters et al. | 379/405 |
| 4,914,693 | 4/1990 | Beck et al. | 379/405 |

FOREIGN PATENT DOCUMENTS

| | | |
|---|---|---|
| 0048477 | 3/1982 | European Pat. Off. . |
| 0112731 | 7/1984 | European Pat. Off. . |
| 2091973 | 8/1982 | United Kingdom . |
| 2093314 | 8/1982 | United Kingdom . |

Primary Examiner—James L. Dwyer
Assistant Examiner—Jhancy Augustus
Attorney, Agent, or Firm—Sughrue, Mion, Zinn, Macpeak & Seas

[57] ABSTRACT

The connection circuit comprises a first differential amplifier circuit having its output connected to a first symmetrical amplifier circuit, a second differential amplifier circuit having its output connected to a second symmetrical amplifier circuit, a power supply and filter circuit for delivering power via a power supply series connection to the two symmetrical amplifier circuits, a balancing circuit, and a loop state signaling circuit. The two differential amplifier circuits are connected firstly to the output of a receive circuit and secondly to ground, and each wire of the line is connected directly via a respective resistor to a transmit circuit. Each symmetrical amplifier circuit is connected to one of the line wires via a contact of a ringing relay and a resistor connected in series. The power supply series connection includes a power supply transistor controlled by a signal indicative of the line being looped.

12 Claims, 2 Drawing Sheets

5,097,503

ELECTRONIC SUBSCRIBER LINE CONNECTION CIRCUIT

The invention relates to feeding a subscriber station by means of an electronic interface circuit.

BACKGROUND OF THE INVENTION

French patent application number 88/12668 in the name of the same inventor and entitled "Dispositif de raccordement de ligne d'abonné" (Subscriber line connection circuit) filed Sept. 28, 1988, describes a circuit connected via a transformer to the subscriber line, and which does not include line current limitation.

European patent number 0 096 756 entitled "Joncteur d'abonné électronique" (Electronic subscriber interface circuit) describes a circuit which can only be made in the form of an integrated circuit because of its complexity and its use of current mirrors. In addition, it is necessary to add parallel protective devices on the line in order to ensure that the voltages on the line wires never exceed the power supply voltages of the integrated interface circuit under any circumstances, with such excess voltages being due to transients affecting the line. This interface circuit does not include metallic isolation between the 0V potential of the battery and logic ground, and as a result, even when the line is affected by transients, it is imperative that there should never be a potential difference of more than two volts between the 0V potential and logic ground.

The object of the invention is to provide an electronic subscriber connection circuit which avoids the drawbacks of the prior art electronic interface circuit.

Another object of the invention is to provide a connection circuit using discrete components and suitable for being implemented using surface-mount technology. Another object of the invention is to provide a low consumption connection circuit.

Another object of the invention is to provide a connection circuit which does not require parallel protective devices other than the voltage-dependent resistors (varistors) that already exist in the subscriber line.

SUMMARY OF THE INVENTION

The present invention provides a subscriber line connection circuit connected to a transmission circuit and to a reception circuit, connected to one line wire via a first fixed contact, a first moving contact of a ringing relay and a first resistor, and to the other line wire via a second fixed contact, a second moving contact of said ringing relay, and a second resistor, and including a loop state signalling circuit connected to the terminals of the first and second resistors and delivering a loop signal, said transmission circuit being connected via a third resistor to the first resistor and via a fourth resistor to the second resistor, the connection circuit also comprising:

first and second differential amplifier circuits having their inputs connected to said reception circuit;

a first symmetrical amplifier circuit connected to the output of the first differential amplifier circuit via a fifth resistor and having an output connected to the first resistor;

a second symmetrical amplifier circuit connected to the output of the second differential amplifier circuit via a sixth resistor and having an output connected to the second resistor;

a first feedback circuit connected in parallel with an ensemble constituted by the first symmetrical amplifier circuit and the first resistor;

a second feedback circuit connected in parallel with an ensemble constituted by the second symmetrical amplifier circuit and the second resistor;

a balancing circuit connected to the outputs of the first and second differential amplifier circuit and to a point common to the transmit circuit and the third resistor, and to a second point common to the transmit circuit and the fourth resistor; and a power supply and filter circuit for filtering the voltage from a battery and for powering the second and first symmetrical amplifier circuits via a power supply series connection, said power supply and filtering circuit being connected to the negative potential of the battery and said first symmetrical amplifier circuit being connected to the positive potential of the battery.

BRIEF DESCRIPTION OF THE DRAWINGS

An embodiment of the invention is described by way of example with reference to the accompanying drawings, in which.

DETAILED DESCRIPTION

Figure 1:
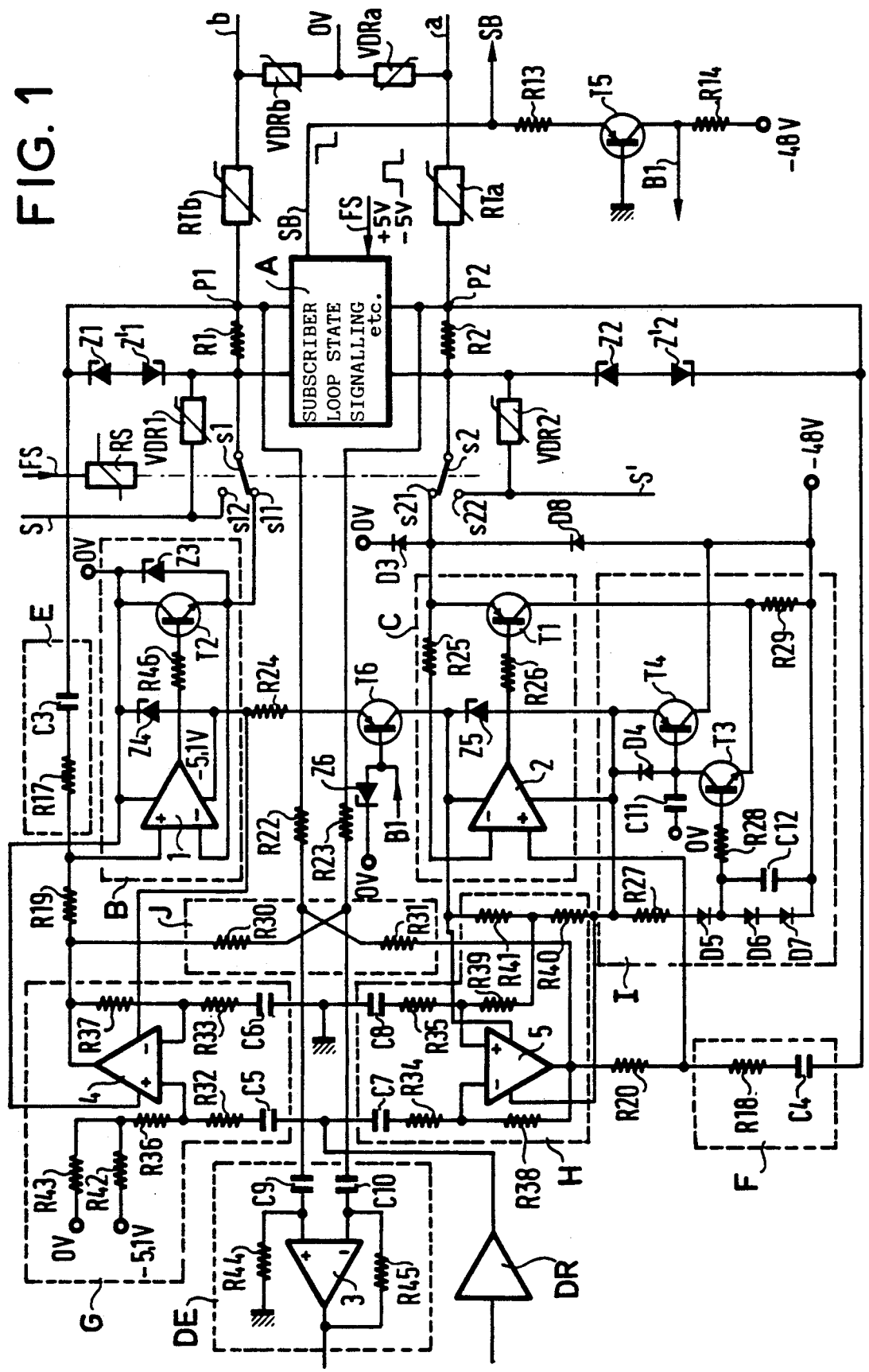
FIG. 1 is a circuit diagram of a connection circuit of the invention.

The connection circuit of the invention as shown in FIG. 1 comprises:

a subscriber loop state signalling circuit A;

two symmetrical amplifier circuits B and C;

a transmit circuit DE and a receive circuit DR;

two feedback circuits E and F associated with respective ones of the amplifier circuits B and C;

two differential amplifier circuits G and H;

a filter and power supply circuit I for filtering battery voltage; and a balancing circuit J.

Figure 2:
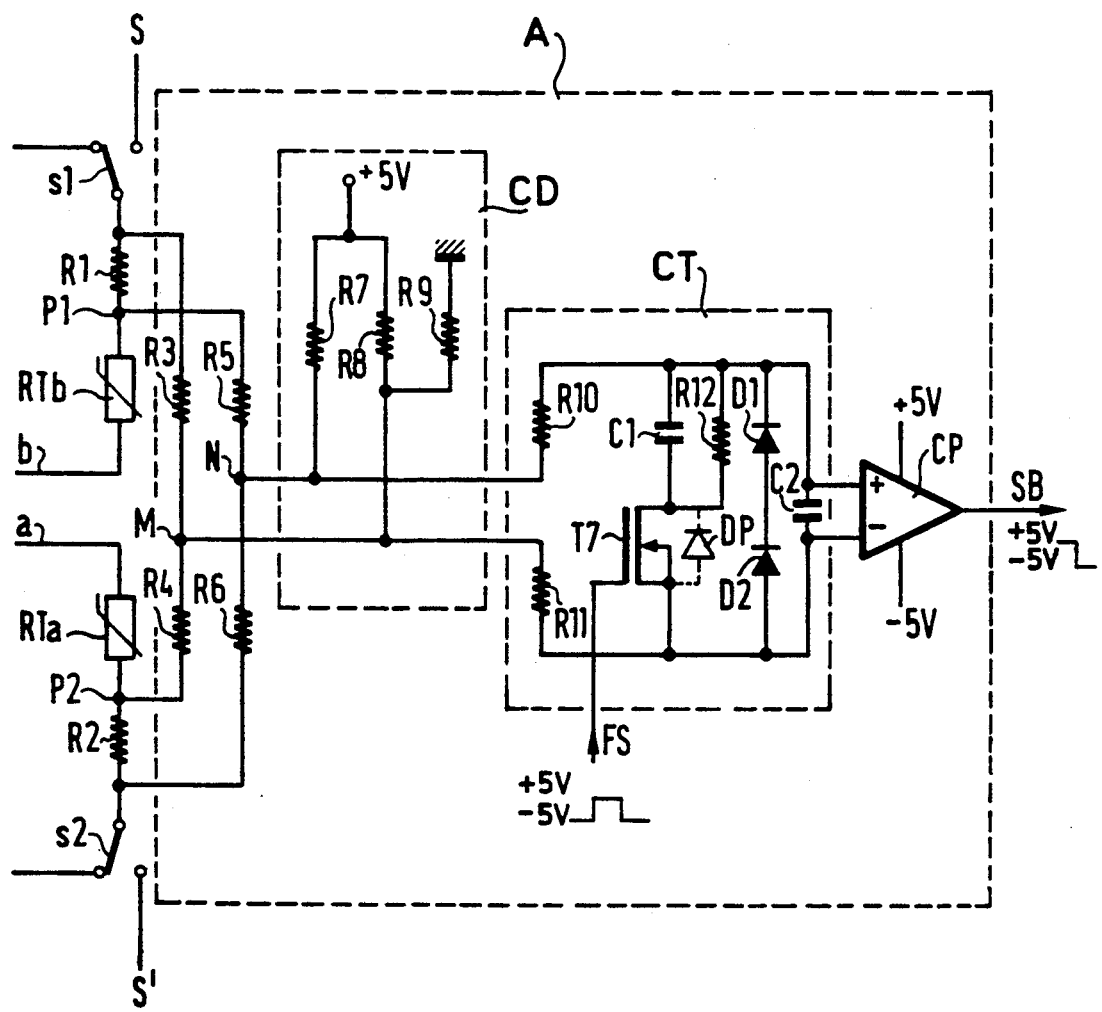
FIG. 2 is a circuit diagram of a loop state signalling circuit shown in FIG. 1.

The subscriber loop state signalling circuit may be constituted, for example, by the circuit of French patent application number 8815417, filed Nov. 25, 1988 and having the same inventor as the present application. This circuit is shown in FIG. 2.

The subscriber line comprises two wires a and b each connected to the 0V potential of a battery via a voltage-dependent resistor VDRa or VDRb.

The b wire is connected via a series connection of a resistor R1 and a resistor RTb having a positive temperature coefficient to a moving contact s1 of a ringing relay RS. The a wire is connected via a series connection of a resistor R2 and a resistor RTa having a positive temperature coefficient to another moving contact s2 of the ringing relay. At rest, the ringing relay RS does not receive a ringing information signal FS, and the moving contact s1 co-operates with a fixed contact s11 while the moving contact s2 co-operates with a fixed contact s21. When in the working position, the ringing relay RS receives a ringing information signal FS, and the moving contacts s1 and s2 co-operate with respective fixed contacts s12 and s22 connected to two ringing generators delivering symmetrical signals S and S' and connected in series with the battery.

A series connection of two oppositely-directed zener diodes Z1 and Z'1 is connected in parallel with the resistor R1, and a voltage dependent resistor VDR1 is connected between the moving contact s1 and the fixed contact s12.

A series connection of two oppositely-directed zener diodes Z2 and Z'2 is connected in parallel with the resistor R2, and a voltage dependent resistor VDR2 is connected between the moving contact s2 and the fixed contact s22.

The resistors VDRa and VDRb protect the subscriber line against short high-amplitude transients (lightning). The resistors RTa and RTb limit short circuit line current. During ringing, the resistors VDR1 and VDR2 limit the arcing voltage that appears firstly between the moving contact s1 and the fixed contact s12 and secondly between the moving contact s2 and the fixed contact s22, which arcing voltage distrubs the operation of the transmit and receive amplifiers. The zener diodes Z1 and Z'1 serve to limit the voltage along the terminals of the resistor R1, and the zener diodes Z2 and Z'2 serve to limit the voltage across the terminals of the resistor R2, in the event of the line being subjected to transients.

The loop state signalling device A is connected to the terminals of resistors R1 and R2 and receives a ringing information signal FS. It delivers a loop state signal SB which may also be used to power down the interface circuit when there is no loop, said signal being delivered to a series circuit constituted by a resistor R13, a control transistor T5, and a resistor R14, with the transistor having its emitter connected to the resistor R13, its base connected to ground, and its collector connected to the resistor R14 which is in turn connected to the −48V potential of the battery. The collector delivers a loop information signal B1. When there is no loop (line open circuit) the loop state signal SB is at a high level of +5V, and the transistor T5 is conductive; when a loop is detected, the signal SB switches to a low level, −5V, thereby switching off the transistor T5 and the signal B1 takes up the −48V level.

The symmetrical amplifier circuit B comprises an amplifier 1, a protective zener diode Z3, a power supply zener diode S4, a transistor T2, and a resistor R46. The zener diodes have their cathodes connected to the 0V potential of the battery. The negative input of the amplifier 1, the emitter of transistor T2, and the anode of zener diode Z3 are all connected to the fixed contact s11. The anode and the cathode of the zener diode Z4 are connected to the power supply terminals of the amplifier 1 whose output is connected via the resistor R46 to the base of the transistor T2. The collector of transistor T2 is connected to the 0V potential. The zener diode Z3 and the resistor R46 protect the amplifier 1.

The feedback circuit E comprises a resistor R17 in series with a capacitor C3, with the resistor being connected to the positive input of the amplifier 1 and with the capacitor being connected to the point P1 which is common to the resistors R1 and RTb.

The symmetrical amplifier circuit C comprises an amplifier 2, a power supply zener diode Z5, two resistors R25 and R26, and a transistor T1. The negative input of the amplifier 2 is connected via a resistor R25 to the fixed contact s21 which is itself connected to a 0V potential via a diode D3. The emitter of the transistor T1 is connected to the fixed contact s21, and its base is connected via the resistor R26 to the output of the amplifier 2. The anodes and the cathode of the zener diode Z5 are connected to the power supply terminals of the amplifier 2.

The resistors R25 and R26 protect the amplifier 2.

The two symmetrical amplifier circuits B and C are interconnected by a power supply transistor T6 and a series connected resistor R24. The transistor T6 has its collector connected to the cathode of the zener diode Z5, its emitter connected to the resistor R24 which is in turn connected to the anode of the zener diode Z4, and its base connected firstly to the 0V positive potential of the battery via a protective zener diode Z6, and secondly to the collector of control transistor T5 from which it receives the loop information signal B1. The power supply zener diodes Z4 and Z5, the power supply transistor T6, and the resistor R24 constitute a power supply series connection running from the 0V positive potential of the battery to the power supply and filter circuit I.

The feedback circuit F comprises a resistor R18 in series with a capacitor C4, with the resistor being connected to the positive input of the amplifier 2 and the capacitor being connected to the point P2 which is common to the resistors R2 and RTa.

The battery voltage filter circuit I comprises two transistors T3 and T4, three resistors R27, R28, and R29, two capacitors C11 and C12, and four diodes D4, D5, D6, and D7. The transistor T4 has its emitter connected to the anode of zener diode Z5, its collector connected to the −48V potential, and its base connected firstly to its emitter via diode D4 and secondly to the 0V potential via capacitor C11. Transistor T3 has its collector connected to the base of T4. Resistor R29 connects the collector of transistor T1 and the emitter of transistor T3 to the −48V potential. The resistor R27 is connected in series with the diodes D5, D6, and D7, with the resistor being connected to the emitter of transistor T4, and the cathode of diode D7 being connected to the −48V potential. The capacitor C12 is in parallel with the diodes D6 and D7, and the transistor T3 is protected by the resistor R28 connected between its base and the point common to diodes D5 and D6.

The −48V potential is also connected via a diode D8 to the fixed contact s21 which is itself connected via diode D3 to the 0V potential. Diodes D3 and D8 limit the excursion of any disturbance to between the 0V and −48V potentials.

The transmit circuit DE comprises a cofidec (coder-filter-decoder) 3, two resistors R44 and R45, and two capacitors C9 and C10. The positive input of the cofidec is connected firstly to ground via resistor R44 and secondly to the capacitor C9. The negative input of the cofidec is connected firstly to the capacitor C10 and secondly to the output of the cofidec via resistor R45. The capacitor C9 is connected via a resistor R22 to point P1, and the capacitor C10 is connected via a resistor R23 to point P2.

The receive circuit DR is constituted by a cofidec having its output connected to the two differential amplifier circuits G and H.

Differential amplifier circuit G comprises an amplifier 4, six resistors R32, R33, R36, R37, R42, and R43, and two capacitors C5 and C6. Amplifier 4 has its positive input connected via the resistor R36 firstly to a resistor R43 itself connected to the 0V potential and secondly to a resistor R42 itself connected to the anode of zener diode Z4 whose potential is −5.1 volts. The positive input is also connected, via resistor R32 and capacitor C5 connected in series, to the output from the receive circuit DR. The negative input and the output of the amplifier 4 are interconnected by resistor R37.

The negative input is also connected to ground via resistor R33 and capacitor C6 connected in series. The output is also connected via a resistor R19 to the positive input of amplifier 1.

Differential amplifier circuit H comprises an amplifier 5, six resistors R34, R35, R38, R39, R40, and R41, and two capacitors C7 and C8. Amplifier 5 has its negative input connected via resistor R34 and capacitor C7 connected in series to the output from the receive circuit DR. The negative input and the output of amplifier C5 are interconnected by resistor R38. The positive input of the amplifier is connected to ground via resistor R35 and capacitor C8 connected in series. Resistors R40 and R41 are connected in series and constitute a divider bridge connected in parallel with zener diode Z5. The positive input of the amplifier 5 is connected via resistor R39 to the point common to resistors R40 and R41. The output of amplifier 5 is connected via a resistor R20 to the positive input of amplifier 2.

Balance circuit J comprises two resistors R30 and R31. Resistor R30 is connected between the output of amplifier 4 and a point common to resistor R23 and capacitor C10. Resistor R31 is connected between the output of amplifier 5 and a point common to resistor R22 and capacitor C9.

The power supply to amplifiers 4 and 5 is not shown in FIG. 1 in order to avoid overcrowding the figure. The power supply terminals of amplifier 4 are connected to the terminals of zener diode Z4 whose anode is at a potential of −5.1 volts relative to the 0V potential. The power supply terminals of amplifier 5 are connected to the terminals of zener diode Z5 providing a voltage between its terminals of 5.1 volts.

FIG. 2 shows the subscriber loop state signalling circuit A of FIG. 1, which circuit constitutes the subject matter of French patent application number 8815417 filed Nov. 25, 1988, as mentioned above. Two series-connected resistors R3 and R4 are connected between moving contact s1 and the point P2. Two other series-connected resistors R5 and R6 are connected between the point P1 and moving contact s2. The point M common to resistors R3 and R4 is connected to ground via a resistor R9 and to a tension of +5V via a resistor R8. The point N common to resistors R5 and R6 is connected to said tension of +5V via a resistor R7.

Together with resistors R1 and R1, the resistors R3 to R6 constitute a circuit for obtaining an image of line current, with resistors R1 and R2 actually forming the image of line current while resistors R3 and R4 and R5 and R6 constitute two branches of said circuit, with said resistors R3 to R6 having equal high resistances, e.g. several hundred thousand ohms each. The resistors R3 to R6 deliver one half the sum of the voltages taken across the terminals of each of resistors R1 and R2, thereby giving an image of line current between points M and N. In the absence of resistors R7 to R9, the voltage appearing between points M and N would be equal to the voltage across the terminals of resistor R1 or resistor R2.

The resistors R7, R8, and R9 constitute a voltage offset circuit CD which serves to displace the tensions present at points M and N into the allowable operating zone of a comparator CP. The divider bridge constituted by resistors R8 and R9 serves to obtain a threshold tension at point M below which it is no longer possible to detect the state of the subscriber loop. In addition, the resistance of resistor R8 in parallel with resistor R9 is equal to the resistance of R7, i.e. $R7 = (R8 \cdot R9)/(R8+R9)$. The tensions at points M and N are negative, e.g. −2.6 volts and −3 volts respectively, in the absence of any line current.

The inputs of the comparator CP are connected to points M and N via a switching circuit CT constituted by a transistor T7, a capacitor C1, resistors R10, R11, and R12, and two diodes D1 and D2. The resistor R10 is connected between the point N and the positive input of the comparator CP. The resistor R11 is connected between the point M of the current sensing circuit and the negative input of the comparator CP. The inputs of the comparator are interconnected by a capacitor C2.

A circuit constituted by capacitor C1 in series with transistor T7 and by resistor R12 in parallel with capacitor C1 is connected to the inputs of the comparator, with the capacitor being connected to the positive input and with the transistor being connected to the negative input. The two diodes D1 and D2 are connected in series, with the diode D2 having its anode connected to the negative input of the comparator and the diode D2 having its cathode connected to the positive input of the comparator.

The transistor T7 is of the VMOS type and acts as a switch. When conducting, it connects the capacitor in parallel with the inputs to the comparator CP. The transistor T7 has its grid connected to a wire which receives the ringing information signal FS at the same time as the ringing relay RS (see FIG. 1) is controlled to connect the a and b wires of the subscriber line to the ringing generators.

When the transistor T7 is conductive, during ringing, it connects the capacitor C1 in parallel with the inputs of the comparator CP such that the alternating component of the signal appearing at points M and N is filtered out by the circuit comprising resistors R10 and R11 and capacitor C1, said circuit having a time constant C1. (R10+R11). This time constant is necessary for filtering the alternating component due to the ringing current and for retaining only a signal which is proportional to the mean value of the loop current in order to make it possible to detect the line being looped during ringing. Resistor R12 has a very high value resistance, e.g. 10 M ohms, and serves merely to fix the potential at the terminals of capacitor C1. Diodes D1 and D2 limit the tension across the terminals of the capacitor CP to about 1 volt in the presence of line current, thereby limiting the reverse charge on the capacitor C1 via the parasitic diode Dp constituted by transistor T7 in the presence of a negative tension at point N.

Too high a reverse voltage across the terminals of capacitor C1 would simulate temporary erroneous loop information when transistor T7 switches on (switches to the conductive state) in the absence of line current. The diodes D1 and D2 limit the reverse tension across the terminals of C1 to a value of d1+d2-dp when a negative tension is present at point N, where d1, d2, and dp are the forward voltage drops across the diodes D1, D2, and DP. This negative tension at point N relative to point M exists when a subscriber is engaged in a call, with the point N being at a lower potential than the point M. Although transistor T7 is not on, capacitor C1 charges via the parasitic diode DP constituted by the transistor. If a ringing signal is applied to the line when the subscriber hangs up, then capacitor C1 will not have had enough time to discharge through resistor R12, and on transistor T7 switching ON, the capacitor voltage is applied to the terminals of comparator CP which then interprets this voltage as being a subscriber loop signal and this signal is clearly a parasitic loop signal. The presence of diodes D1 and D2 therefore limits the tensions across the terminals of the comparator to about 1 volt in the presence of line current. It should be observed that when the subscriber hangs up, the capacitor C1 discharges through resistor R12 and then charges in the opposite direction since at rest, i.e. when there is no line current, the potential of point N is greater than that of point M. When line current exists, the potential at point M becomes greater than that at point N and the capacitor C1 charges in the opposite direction to its rest state.

The loop signal SB delivered by the comparator switches from a value of +5 volts to a value of −5 volts when the line is looped.

The signalling device serves to detect when the subscriber line is in the looped state either with or without ringing current.

Metallic isolation of the subscriber line is provided by:

the high value resistance of resistors R3 to R6 in the subscriber loop state signalling circuit A;

the equal high resistance resistors R22 and R23 for D.C. purposes and by the capacitor C9 and C10 for A.C. purposes on transmission; and the differential amplifiers G and H, i.e. the amplifiers 4 and 5 and the associated components, on reception.

The ringing relay RS serves to switch the wires a and b of the line, and the resistors R1 and R2 to an 80 volts rms A.C. voltage which is superposed on the battery voltage.

The symmetrical amplifier circuits B and C feed D.C. to the line, transmit reception signals, and participate in attenuating return signals (echoes) both in transmission and in reception.

The subscriber loop state signalling circuit A indicates the state of the loop in normal mode or in ringing mode by means of the signal SB. The transistor T6 is controlled by the signal B1 which is at a high level of +0.3 volts when the subscriber loop is open, thereby switching off transistor T6. After looping has been detected, the signal B1 switches to a low level, thereby switching on transistor T6. The voltage of zener diode Z6 is 11 volts, for example, so the low level of the signal B1 is −11 volts. Amplifiers 1, 2, 4, and 5 are therefore powered only when the signal B1 is present, thereby reducing the consumption of the connection circuit.

As soon as the loop signalling circuit A detects the subscriber line as being looped, the signal B1 switches on the transistor T6 and the subscriber line is fed by the symmetrical amplifier circuits B and C.

On transmission, the transmission signals present on the line at points P1 and P2 are applied via resistors R22 and R23 to the transmission circuit DE. In the transmission circuit, the transmission signals are applied via capacitors C9 and C10 to the differential amplifier of cofidec 3 and are transposed relative to ground by said differential amplifier associated with resistors R44 and R45.

On reception, the reception signals coming from the cofidec of reception circuit DR are initially transposed relative to the 0V potential by the two differential amplifiers 4 and 5. These two amplifiers are referenced to the 0V potential by: the resistor R43, the resistor R42, and the zener diode Z4 for amplifier 4, and by resistors R40 and R41, zener diode Z5, transistor T4, and capacitor C11, for amplifier 5.

The symmetrical amplifier circuits B and C receive the line feed D.C. voltages together with low frequency signals in phase opposition from the amplifiers 4 and 5. These D.C. voltages are referenced relative to the 0V potential and they come: for symmetrical amplifier circuit B, from the divider bridge constituted by resistors R42 and R43 of differential amplifier circuit G, said bridge fixing the cut-off voltage relative to the 0V potential; and for the symmetrical amplifier circuit C, from the divider bridge constituted by resistors R40 and R41 of the differential amplifier circuit H, said divider bridge fixing the cut-off voltage relative to a negative potential resulting from line current being limited by the filter circuit I.

The symmetrical amplifier circuits B and C transmit D.C. and A.C., and they synthesize a line impedance having a value of 2×300 ohms. The resistors RTa and RTb in series with the line each have a value of 35 ohms, with each symmetrical amplifier circuit B and C synthesizing an impedance of 265 ohms. This is achieved by feedback round the amplifiers 1 and 2 as provided by the feedback circuits E and F. In the feedback circuits E and F, the capacitors C3 and C4 prevent the operating points of the amplifiers 1 and 2 being disturbed by the voltage drop across resistors R1 and R2 each having a resistance of 100 ohms, said drop being set up by the line current. This method of directly synthesizing line impedance makes it possible to obtain good echo attenuation on transmission and on reception, thereby providing more accurate gain by virtue of the low dispersion of output voltages from the amplifiers 1 and 2.

2-wire/4-wire balancing is provided by resistors R30 and R31 of balance circuit J which serve respectively to cancel the signals from resistors R22 and R23 on reception.

The battery voltage filter circuit I also limits line current. Any disturbance present on the −48V potential of the battery is filtered by capacitor C11 and transistor T3 which operates as a current generator. Transistor T4 therefore transmits a D.C. voltage relative to the 0V potential to the common point between resistors R40 and R41, said point constituting the reference point for line wire a.

The diode D5 is an antisaturation diode for transistor T3. On long lines, the transistor T3 could be saturated, in which case power supply noise rejection at the −48V potential would become defective. The 0.1 microfarad capacitor C12 improves noise rejection, particularly when the transistor T3 is tending towards saturation. The point common to resistors R42 and R43 in the differential amplifier circuit G constitute the reference point of line wire b, and it is filtered by zener diode Z4 of symmetrical amplifier circuit B.

The resistor R29 of filter circuit I gives an image of the current flowing through transistor T1. The current generator constituted by transistor T3 compares the voltage across the terminals of R29 with a reference voltage delivered by the diodes D6 and D7 connected in series. The result of the comparison as filtered by the capacitor C11 adjusts the reference point of the a wire (point common to resistors R40 and R41) to a voltage such that the transistor T3 which performs the comparison is in equilibrium. In this way, the line current is limited to 27 mA, for example.

The connection circuit of the invention thus makes it possible to use discrete components that may be mounted on a printed circuit card using surface-mount technology, thereby reducing the cost of making such a circuit. By limiting line current and feeding the circuits only when a loop is known to be present, the consumption of the connection circuit is reduced. In addition, line current limitation makes it pointless to change the resistors R1 and R2 which are in series with the line in order to adapt the connection circuit to the various different current limit values in different countries.

The characteristics of gain, longitudinal symmetry, and return loss have low dispersion.

In addition, the connection circuit of the invention makes it pointless to use a booster in order to adapt to a battery voltage of −54 volts when required by the standards of certain countries.

I claim:

1. A subscriber line connection circuit connected to a transmission circuit and to a reception circuit, connected to one line wire via a first fixed contact, a first moving contact of a ringing relay and a first resistor, and to the other line wire via a second fixed contact, a second moving contact of said ringing relay, and a second resistor, and including a loop state signalling circuit connected to the terminals of the first and second resistors and delivering a loop signal, said transmission circuit being connected via a third resistor to the first resistor and via a fourth resistor to the second resistor, wherein the connection circuit also comprises:

first and second differential amplifier circuits having their inputs connected to said reception circuit;
   a first symmetrical amplifier circuit connected to the output of the first differential amplifier circuit via a fifth resistor and having an output connected to the first resistor;
   a second symmetrical amplifier circuit connected to the output of the second differential amplifier circuit via a sixth resistor and having an output connected to the second resistor;
   a first feedback circuit connected in parallel with an ensemble constituted by the first symmetrical amplifier circuit and the first resistor;
   a second feedback circuit connected in parallel with an ensemble constituted by the second symmetrical amplifier circuit and the second resistor;
   a balancing circuit connected to the outputs of the first and second differential amplifier circuit and to a point common to the transmit circuit and the third resistor, and to a second point common to the transmit circuit and the fourth resistor; and
   a power supply and filter circuit for filtering the voltage from a battery and for powering the second and first symmetrical amplifier circuits via a power supply series connection, said power supply and filtering circuit being connected to the negative potential of the battery and said first symmetrical amplifier circuit being connected to the positive potential of the battery.

2. A connection circuit according to claim 1, wherein the power supply series connection is constituted by a first power supply zener diode, a seventh resistor, a power supply transistor, and a second power supply zener diode, the first power supply zener diode having its cathode connected to the positive potential and its anode connected to a seventh resistor, the second power supply zener diode having its anode connected to the power supply and filter circuit and its cathode connected to the power supply transistor, and the power supply transistor having its base connected to the positive potential via a protective zener diode, said base receiving a signal B1 for switching on the power supply transistor when the subscriber loop is looped.

3. A connection circuit according to claim 2, wherein the loop state signalling circuit has its output connected to a control transistor having its collector connected firstly to the base of the power supply transistor and secondly to the negative battery potential via a collector resistor, said control transistor delivering said signal B1.

4. A connection circuit according to claim 2, wherein the first symmetrical amplifier circuit comprises the first power supply zener diode, a first amplifier having a positive input connected firstly to the first differential amplifier circuit via the fifth resistor and secondly to the first feedback circuit, a negative input connected to the first fixed contact, a first transistor having its emitter connected to said first fixed contact, its collector connected to the positive battery potential, and its base connected via an eighth resistor to the output from the first amplifier, and a protective zener diode in parallel with the first transistor, the first amplifier having its power supply terminals connected in parallel with the first power supply zener diode.

5. A connection circuit according to claim 2, wherein the second symmetrical amplifier circuit comprises the second power supply zener diode, a second amplifier having a positive input connected firstly to the second differential amplifier circuit via the sixth resistor and secondly to the second feedback circuit, a negative input connected via a ninth resistor to the second fixed contact, and a second transistor having its emitter connected to the second fixed contact, its base connected via a tenth resistor to the output from the second amplifier, and its collector connected via the power supply and filter circuit to the negative battery potential, the second amplifier having its power supply terminal connected in parallel with the second power supply zener diode.

6. A connection circuit according to claim 2, wherein the power supply and filter circuit comprises a third transistor having its emitter connected via an eleventh resistor to the negative potential, and a fourth transistor having its collector connected to the negative potential, its emitter connected to the power supply series connection, and its base connected to its emitter via a first diode, to the positive potential via a filter capacitor, and to the collector of the third transistor, that the emitter of the fourth transistor is connected via a twelfth resistor in series with a second, a third, and a fourth diode to the negative potential, and that the third transistor has its base connected via a thirteenth resistor to a first capacitor itself connected in parallel with the third and fourth diodes.

7. A connection circuit according to claim 2, wherein the first differential amplifier circuit comprises a third amplifier having a positive input connected via a fourteenth resistor in series with a second capacitor to the output from the reception circuit and via a fifteenth resistor firstly to the anode of the first power supply zener diode via a sixteenth resistor and secondly to the positive potential via a seventeenth resistor, and a negative input connected firstly to its output via an eighteenth resistor and secondly to ground via a nineteenth resistor in series with a third capacitor, said third amplifier having power supply terminals connected in parallel with the first power supply zener diode.

8. A connection circuit according to claim 2, wherein the second differential amplifier circuit comprises a divider bridge constituted by a twentieth resistor and a twenty-first resistor connected in series, said divider bridge being connected in parallel with the second power supply zener diode, and a fourth amplifier having a negative input connected firstly to its output via a twenty-second resistor and secondly to the output of the reception circuit via a twenty-third resistor in series with a fourth capacitor, and a positive input connected firstly to said divider bridge via a twenty-fourth resistor and secondly to ground via a twenty-fifth resistor in series with a fifth capacitor, said fourth amplifier having its power supply terminals connected in parallel with the second power supply zener diode.

9. A connection circuit according to claim 1, wherein the first and second feedback circuits are each constituted by a resistor connected in series with a capacitor.

10. A connection circuit according to claim 1, wherein the second fixed contact of the ringing relay is connected firstly to the positive potential via a fifth diode and secondly to the negative potential via a sixth diode.

11. A connection circuit according to claim 1, wherein the transmit circuit includes sixth and seventh input capacitors with the sixth capacitor being connected to the third resistor and with the seventh capacitor being connected to the fourth resistor.

12. A connection circuit according to claim 1, wherein the balancing circuit comprises a twenty-sixth resistor connected between the output of the first differential amplifier circuit and said first common point, and a twenty-seventh resistor connected between the output of the second differential amplifier circuit and said second common point.

* * * * *